(12) United States Patent
Hama et al.

(10) Patent No.: US 10,846,380 B2
(45) Date of Patent: Nov. 24, 2020

(54) IMAGE PROCESSING APPARATUS, IMAGE PROCESSING METHOD, AND IMAGE PROCESSING PROGRAM

(71) Applicant: FUJITSU LIMITED, Kawasaki (JP)

(72) Inventors: Soichi Hama, Atsugi (JP); Yukihiro Abiko, Kawasaki (JP); Satoshi Maeda, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 16/108,250

(22) Filed: Aug. 22, 2018

(65) Prior Publication Data
US 2019/0065710 A1 Feb. 28, 2019

(30) Foreign Application Priority Data

Aug. 25, 2017 (JP) .................. 2017-162759

(51) Int. Cl.
*G06F 21/31* (2013.01)
*G06F 3/042* (2006.01)
*G06K 9/00* (2006.01)
*G06F 3/03* (2006.01)
*G06F 16/435* (2019.01)
(Continued)

(52) U.S. Cl.
CPC .............. *G06F 21/31* (2013.01); *G06F 3/017* (2013.01); *G06F 3/0325* (2013.01); *G06F 3/0346* (2013.01); *G06F 3/0354* (2013.01); *G06F 3/0421* (2013.01); *G06F 16/436* (2019.01); *G06F 21/32* (2013.01); *G06K 9/0002* (2013.01); *G06K 9/00013* (2013.01);
(Continued)

(58) Field of Classification Search
CPC ........ G06F 16/436; G06F 21/31; G06F 21/32; G06F 3/017; G06F 3/0325; G06F 3/0346; G06F 3/0354; G06F 3/0421; G06K 9/00013; G06K 9/0002; G06K 9/00087; G06K 9/00604; G06K 2009/0006
USPC .......................... 382/115, 117–118, 124–125
See application file for complete search history.

(56) References Cited

U.S. PATENT DOCUMENTS 9,100,582 B2 8/2015 Aoki
9,298,965 B2 3/2016 Aoki
(Continued)

FOREIGN PATENT DOCUMENTS

JP 2006-155575 6/2006
JP 2009-042857 2/2009
JP 2016-173669 9/2016

OTHER PUBLICATIONS

EESR—Extended European Search Report of European Patent Application No. 18189702.6 dated Oct. 12, 2018.
(Continued)

*Primary Examiner* — Daniel G Mariam
(74) *Attorney, Agent, or Firm* — Fujitsu Patent Center

(57) ABSTRACT

A computer-implemented method for image processing, the method includes: acquiring an image of a body part captured by an imaging circuit; and determining, in a case where there is a region where luminance is saturated in the acquired image, a cause of the saturation of the luminance based on a distribution of the luminance in the acquired image. The cause is either the distance between the imaging circuit and the body part being shorter than a predetermined distance or an influence of external light.

15 Claims, 10 Drawing Sheets

(51) Int. Cl.
*G06F 3/0346* (2013.01)
*G06F 3/01* (2006.01)
*G06F 3/0354* (2013.01)
*G06F 21/32* (2013.01)

(52) U.S. Cl.
CPC ..... *G06K 9/00087* (2013.01); *G06K 9/00604* (2013.01); *G06K 2009/0006* (2013.01)

(56) References Cited

U.S. PATENT DOCUMENTS

| | | | |
|---|---|---|---|
| 9,373,047 B2 | 6/2016 | Aoki | |
| 10,440,339 B2 * | 10/2019 | Kitajima | H04N 9/73 |
| 10,460,187 B2 * | 10/2019 | Oda | G06F 16/583 |
| 2006/0098848 A1 | 5/2006 | Nagasaka et al. | |
| 2016/0275334 A1 | 9/2016 | Hama et al. | |

OTHER PUBLICATIONS

EPOA—Office Action of European Patent Application No. 18189702.6 dated Oct. 30, 2019.
EP Communication—Result of consultation Notice—about the details of the cited reference, D2 (US9100582B2) for the European Patent Application No. 18189702.6 dated Nov. 6, 2019.

* cited by examiner

IMAGE PROCESSING APPARATUS, IMAGE PROCESSING METHOD, AND IMAGE PROCESSING PROGRAM

CROSS-REFERENCE TO RELATED APPLICATION

This application is based upon and claims the benefit of priority of the prior Japanese Patent Application No. 2017-162759, filed on Aug. 25, 2017, the entire contents of which are incorporated herein by reference.

FIELD

The embodiment discussed herein is related to an image processing apparatus, an image processing method, and an image processing program.

BACKGROUND

As a technique for securing the security of computers and networks, there is a method of performing identity verification by biometric authentication. Biometric authentication is an authentication technique for performing identity verification by using biometric information (biometric features) such as fingerprints, faces, veins, and the like. In the biometric authentication, biometric information acquired in a situation where identity verification is mandatory is compared (verified) with biometric information registered in advance, and in a case where both match, a person is authenticated. Biometric authentication technology is also being applied to portable electronic devices (mobile terminals) such as tablet-type computers and smart-phones that may be used in various situations whether indoors or outdoors, for example.

The user of the portable electronic device may also operate a portable electronic device held in a hand while moving, for example. However, in a case where biometric authentication using a portable electronic device is performed in an unstable use situation around the user such as a passenger car, a bus, and a railroad, it is difficult to fix the position of the portable electronic device. For this reason, during the input of biometric information, the positional relationship between a biometric sensor and a body part may be blurred, and the quality of the input biometric information may deteriorate. When the quality of the biometric information deteriorates, the degree of coincidence with the biometric information registered in advance decreases, an authentication failure is likely to occur, the operation time and the number of operations are increased, and convenience is greatly impaired.

As a technique for suppressing blurring of the positional relationship between the biometric sensor and the body part at the time of inputting the biometric feature using the portable electronic device, there is a method of using the touch panel device provided in the portable electronic device (for example, see Japanese Laid-open Patent Publication No. 2016-173669). With this type of technique, by reading the information of a palm at the same time as manipulating a touch panel device, it is possible to fix a relative positional relationship between the biometric sensor and the palm, thereby suppressing the deterioration of the quality of biometric information due to the influence of shaking and the like occurring around the user.

In the case of performing biometric authentication with a portable electronic device, for example, when imaging a body part such as a palm by a camera (biometric sensor), capturing is sometimes performed in a state in which the body part is separated from the camera. In addition, in a case where biometric authentication is performed with a portable electronic device, it is possible to perform biometric authentication in a bright environment such as outdoor or indoor windows into which strong external light such as sunlight or the like is inserted. However, in the case of acquiring an image of a body part under a bright environment, a region where the luminance is saturated occurs in the image due to the influence of external light, and it is difficult to extract appropriate biometric information in some cases. Therefore, in a case where there is a region where the luminance is saturated in the image of the body part, the gain of the camera (biometric sensor) or the exposure time decrease, and the capturing of an image is performed again. Furthermore, in a case where there is a region where the luminance is saturated even in the re-captured image, for example, images are repeatedly captured until saturation of luminance is resolved while changing the gain and exposure time of the camera.

In addition, in the case of capturing an image in a state in which the body part is separated from the camera, for example, there is a case where the body part is irradiated with light output from a light source installed in the vicinity of the camera for capturing. In this case, when the distance from the camera to the body part is shorter than the appropriate distance (that is, the position of the body part is too close), a region where the luminance is saturated occurs in the image. However, in a case where the luminance is saturated because the distance from the camera to the body part is shorter than the appropriate distance, even if saturation of luminance is removed, if the position of the body part does not change, the image becomes unclear and it is difficult to extract appropriate biometric information.

As described above, there are a plurality of causes for the occurrence of a region where the luminance is saturated in the image of the body part, but there are different measures to be taken when re-capturing an image depending on each cause. Therefore, in a case where an image is re-captured without taking an appropriate measure according to the cause of occurrence of the region where the luminance is saturated, the re-capturing is repeated without obtaining appropriate biometric information.

In one aspect, the present disclosure aims to efficiently acquire an appropriate image of a body part to be used for biometric authentication.

SUMMARY

According to an aspect of the invention, a computer-implemented method for image processing, the method includes: acquiring an image of a body part captured by an imaging device; and determining, in a case where there is a region where luminance is saturated in the acquired image, a cause of the saturation of the luminance based on a distribution of the luminance in the acquired image. The cause is either the distance between the imaging device and the body part being shorter than a predetermined distance or an influence of external light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
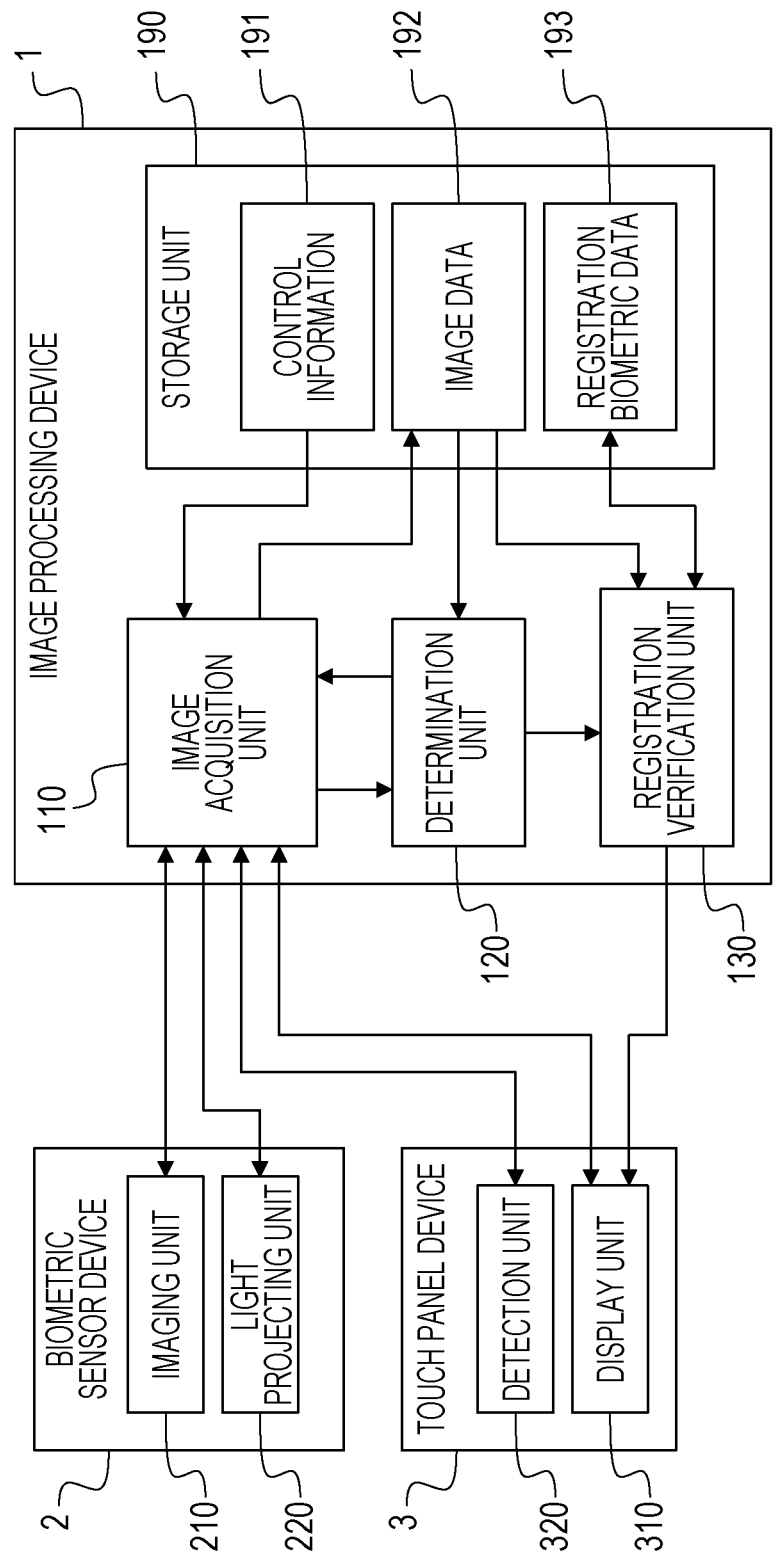
FIG. 1 is a diagram illustrating a functional configuration of an image processing device according to an embodiment.

FIG. 1 is a diagram illustrating a functional configuration of an image processing device according to an embodiment.

As illustrated in FIG. 1, an image processing device 1 of the present embodiment includes an image acquisition unit 110, a determination unit 120, a registration verification unit 130, and a storage unit 190.

The image acquisition unit 110 acquires an image (hereinafter, referred to as "biometric image") obtained by imaging a body part from an imaging unit (or an imaging circuit) 210 of a biometric sensor device 2. The biometric sensor device 2 includes the imaging unit 210 that images a body part and a light projecting unit 220 that projects (irradiates with light) the body part when imaging the body part. Based on control information 191 stored in a storage unit 190, for example, the image acquisition unit 110 controls imaging conditions (for example, gain, exposure time, and the like) of the imaging unit 210 of the biometric sensor device 2, the output of the light projecting unit 220 (brightness), and the like.

In addition, the image acquisition unit 110 in the image processing device 1 of FIG. 1 controls the imaging timing of the imaging unit 210 based on the position information of the body part detected by the touch panel device 3. The touch panel device 3 includes a display unit 310 that displays images and the like, and a detection unit 320 that detects the positions of a finger, a stylus or the like on the display screen of the display unit 310. For example, the image acquisition unit 110 causes the display unit 310 of the touch panel device 3 to display a screen for presenting the position and moving direction of the body part and acquires the position of the body part detected by the detection unit 320 of the touch panel device 3. Then, when the body part moving in a predetermined direction reaches a predetermined position, the image acquisition unit 110 causes the imaging unit 210 to capture a biometric image and acquires the biometric image. At this time, for example, the image acquisition unit 110 causes the imaging unit 210 to capture a plurality of biometric images within the moving range of the body part and to store the plurality of biometric images acquired from the imaging unit 210 in the storage unit 190 as image data 192. Furthermore, for example, the image acquisition unit 110 acquires information indicating which of a process of registering biometric information and a process of verifying biometric information (authentication) is performed from the detection unit 320 of the touch panel device 3.

In addition, when re-capturing a biometric image without being able to use the acquired biometric image for registration and verification of biometric information, the image acquisition unit 110 switches the contents of control for the biometric sensor device 2 and the touch panel device 3 according to reasons of not being able to use for registration and verification of biometric information. For example, when the distance from the biometric sensor device 2 to the body part is shorter than an appropriate distance, the image acquisition unit 110 causes the display unit 310 of the touch panel device 3 to display information indicating that the distance from the biometric sensor device 2 to the body part to be increased. In this case, the image acquisition unit 110 causes the biometric sensor device 2 to re-capture a biometric image without changing the control information for the imaging unit 210 and the light projecting unit 220 of the biometric sensor device 2. In addition, for example, in a case where the captured biometric image is influenced by strong external light, the image acquisition unit 110 changes the control information for the imaging unit 210 and the light projecting unit 220 of the biometric sensor device 2 so as to cause the biometric sensor device 2 to re-capture a biometric image.

The determination unit 120 determines whether or not the acquired biometric image may be used for registration and verification of biometric information. The determination unit 120 in the image processing device 1 of the present embodiment determines whether or not it is possible to extract appropriate biometric information from the biometric image based on the ratio of the pixels whose luminance value is equal to or larger than a first threshold value among all the pixels in one biometric image, for example. In a case where the ratio of the pixels whose luminance value is equal to or larger than the first threshold value is equal to or less than a second threshold value, the determination unit 120 determines that it is possible to extract appropriate biometric information from the biometric image (that is, usable for registration and verification of biometric information).

In addition, in a case where the ratio of pixels whose luminance value is equal to or larger than the first threshold value is larger than the second threshold value, the determination unit 120 determines that there is a saturated region of luminance in the biometric image and it is difficult to extract appropriate biometric information (that is, unusable for registration and verification of biometric information). In this case, the determination unit 120 further determines whether the cause of occurrence of the saturated region is caused by the proximity of the body part or by the influence of external light. Here, the proximity of the body part means that the distance from the biometric sensor device 2 to the body part is shorter than an appropriate distance (that is, the position of the body part is too close).

In addition, if it is determined that the acquired biometric image may not be used for registration and verification of biometric information, the determination unit 120 in the image processing device 1 of the present embodiment notifies the image acquisition unit 110 of information including the cause of occurrence of the saturated region and an instruction to re-capture. When receiving this notification, the image acquisition unit 110 causes the biometric sensor device 2 to re-capture a biometric image and acquires the biometric image. At this time, as described above, the image acquisition unit 110 switches the contents of control for the biometric sensor device 2 and the touch panel device 3 according to the cause of occurrence of the saturated region.

The registration verification unit 130 extracts biometric information from the biometric image and performs registration processing and verification processing of the biometric information based on an instruction input from the touch panel device 3 or the like. In a case where information instructing execution of registration processing of biometric information or the like is input from the touch panel device 3, the registration verification unit 130 extracts biometric information from the biometric image (image data 192) stored in the storage unit 190 and registers the extracted biometric information in registration biometric data 193 of the storage unit 190. On the other hand, in a case where information instructing execution of verification processing of biometric information or the like is input from the touch panel device 3, the registration verification unit 130 verifies the biometric information extracted from the biometric image (image data 192) against the biometric information registered in the registration biometric data 193. In a case where the biometric information extracted from the biometric image matches the biometric information registered in the registration biometric data 193, the registration verification unit 130 causes the display unit 310 of the touch panel device 3 to display information indicating that the verification (authentication) has succeeded, for example. On the other hand, in a case where the biometric information matching the biometric information extracted from the biometric image is not registered in the registration biometric data 193, the registration verification unit 130 causes the display unit 310 of the touch panel device 3 to display information indicating that the verification (authentication) has failed, for example.

Figure 2:
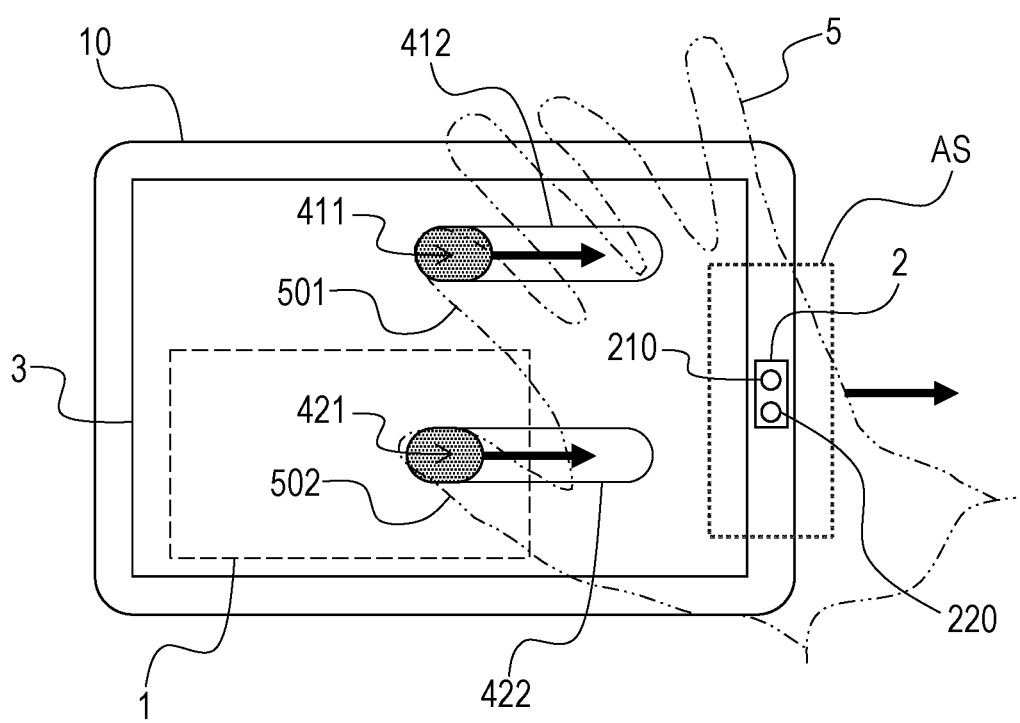
FIG. 2 is a diagram for describing an application example of the image processing device according to the embodiment.

FIG. 2 is a diagram for describing an application example of the image processing device according to the embodiment.

The image processing device 1 of the present embodiment is applicable to, for example, a portable electronic device (mobile terminal) 10 as illustrated in FIG. 2. For example, a portable electronic device 10 is a combination of a plurality of devices including an information processing device that operates as the image processing device 1, the biometric sensor device 2, and the touch panel device 3 housed in a casing. For example, the portable electronic device 10 has a function of authenticating a user based on a biometric image captured by the imaging unit 210 of the biometric sensor device 2.

When authenticating a user in the portable electronic device 10 of FIG. 2, for example, an image of the palm at a hand 5 of the user is acquired as a biometric image and a vein pattern of the palm in the biometric image is extracted as biometric information (biometric feature).

When capturing the image of the palm of the user with the biometric sensor device 2, the hand 5 of the user is captured in a state of being close to the biometric sensor device 2. Therefore, an imaging range AS in the imaging unit 210 of the biometric sensor device 2 may become narrower than the entire palm of the hand 5 of the user. Thus, when the imaging range is narrower than the entire palm, in order to compensate for lack of biometric information, a plurality of biometric images are captured while moving the hand 5 of the user on the biometric sensor device 2. In this case, in order to assist the user in correctly moving the hand 5, for example, marks 411 and 421 and guides 412 and 422 are displayed on the display unit of the touch panel device 3. The marks 411 and 421 are figures presenting the positions of an index finger 501 and a thumb 502, respectively. The guides 412 and 422 are figures presenting the directions and amounts of movement of the index finger 501 and the thumb 502, respectively.

As illustrated in FIG. 2, in the case capturing an image of the palm of the user's right hand 5 with the touch panel device 3 positioned on the left side of the biometric sensor device 2, for example, at first, an image in which the positions of the marks 411 and 421 are the left ends of the guides 412 and 422 is displayed on the display unit of the touch panel device 3. When the user who saw this display touches the display position of the mark 411 in the detection unit with the index finger 501 of the right hand 5 and touches the display position of the mark 412 in the detection unit with the thumb 502, the processing of capturing a biometric image is started.

Thereafter, the user moves the hand 5 to the right so that the index finger 501 moves the surface of the detection unit along the guide 412 and the thumb 502 moves the surface of the detection unit along the guide 422. At this time, each time the positions of the index finger 501 and the thumb 502 detected by the detection unit of the touch panel device 3 reach predetermined positions, the image processing device 1 causes the biometric sensor device 2 to capture a biometric image to acquire a plurality of biometric images.

After acquiring a plurality of biometric images, the image processing device 1 extracts biometric information from each of a plurality of biometric images and performs registration processing or verification processing. In the case of performing the registration processing, the image processing device 1 registers the extracted biometric information in the registration biometric data 193 in a predetermined data format. In the case of performing the verification processing, the image processing device 1 verifies the extracted biometric information against the biometric information registered in the registration biometric data 193. In the case of performing the verification processing, if verification (authentication) is successful, for example, the portable electronic device 10 is in a state in which it is possible to read out and edit various data held therein and connect to the network.

In the case of capturing a biometric image with the portable electronic device 10 of FIG. 2, the user moves the body part (palm of the hand) to be captured in a predetermined direction in a state of being separated from the biometric sensor device 2. In addition, when a biometric image is captured by the biometric sensor device 2, the body part is captured with the light being irradiated by the light projecting unit 220. Therefore, in a case where the distance from the biometric sensor device 2 to the body part (palm) is close to an appropriate range, the luminance of the biometric image partially saturates and it is difficult to extract biometric information in some cases. In addition, even if the distance from the biometric sensor device 2 to the body part (palm) is within the appropriate range, the luminance of the biometric image may be partially saturated due to the influence of external light and it may be difficult to extract the biometric information. In particular, the portable electronic device 10 is used outdoors in many opportunities, and the range of brightness (intensity) of external light at the time of use is wide. Therefore, when strong external light is incident on the body part from between the biometric sensor device 2 and the body part (palm of the hand), due to the influence of the external light, it is difficult to extract biometric information by partially saturating the luminance of the biometric image in some cases. In a case where the luminance of the biometric image is saturated and it is difficult to extract the biometric information, the image processing device 1 causes the biometric sensor device 2 to re-capture a biometric image.

In the case of re-capturing the biometric image (that is, in a case of re-capturing), measures are taken to suppress the saturation of the luminance for capturing. However, in a case where the degree of freedom of the surrounding environment at the time of capturing a biometric image is high, there are roughly two causes for the cause of occurrence of a saturated region, and appropriate measures are different depending on each cause. When saturation occurs, it is difficult to determine the proximity state from the image, and it is difficult to distinguish whether the cause of saturation is due to proximity or external light. Therefore, in a case where measures when re-capturing a biometric image are not appropriate, the number of times of capturing a biometric image increases and the convenience may decrease.

Figure 3:
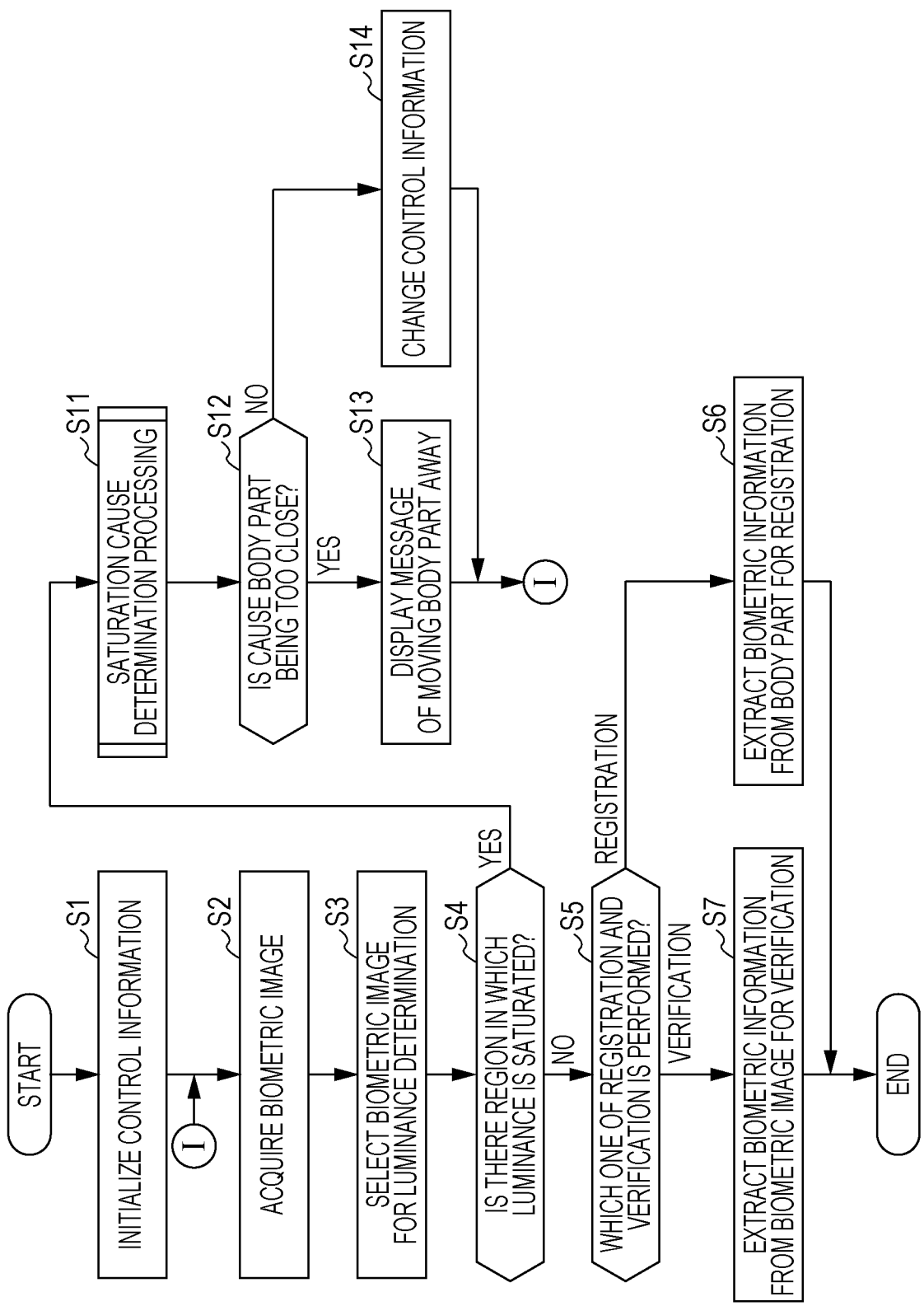
FIG. 3 is a flowchart illustrating processing performed by the image processing device according to the embodiment.

In the image processing device 1 according to the present embodiment, when a signal including an instruction to register or verify biometric information is input from the touch panel device 3, for example, the processing according to the flowchart of FIG. 3 is performed.

FIG. 3 is a flowchart illustrating processing performed by the image processing device according to the embodiment.

As illustrated in FIG. 3, at first, the image processing device 1 of the present embodiment initializes the control information (step S1). The processing of step S1 is performed by the image acquisition unit 110. From the control information 191 of the storage unit 190, the image acquisition unit 110 reads the initial information including the initial value of the imaging conditions for the imaging unit 210 of the biometric sensor device 2 and the initial value of the output from the light projecting unit 220.

Next, the image processing device 1 controls the operations of the imaging unit 210 and the light projecting unit 220 of the biometric sensor device 2 based on the control information and acquires a biometric image (step S2). The processing of step S2 is performed by the image acquisition unit 110. In the case of acquiring a plurality of biometric images captured while moving the body part on the biometric sensor device 2, the image acquisition unit 110 causes the display unit 310 of the touch panel device 3 to display a screen indicating the position and moving direction of the body part. In addition, the image acquisition unit 110 controls the imaging timing of the imaging unit 210 of the biometric sensor device 2 based on the position of the body part detected by the detection unit 320 of the touch panel device 3. The image acquisition unit 110 causes the storage unit 190 to store the acquired plurality of biometric images as the image data 192.

Next, the image processing device 1 selects a biometric image for luminance determination from among the plurality of acquired biometric images (step S3) to determine whether or not there is a region where the luminance is saturated in the selected biometric image (step S4). The determination unit 120 performs the selection processing in step S3 and the determination in step S4. The determination unit 120 selects one biometric image among a plurality of biometric images according to a predetermined selection rule. The selection rule of the biometric image is, for example, an image obtained by capturing the central portion of the entire imaging range of the body part. It is possible to distinguish which portion of the entire imaging range of the body part is captured in each of the plurality of biometric images based on the position of the body part detected by the detection unit 320 of the touch panel device 3 during the period in which the biometric images are being captured.

After selecting the biometric image, the determination unit 120 calculates the ratio of the pixels whose luminance is saturated with respect to all the pixels in the selected biometric image. Here, it is assumed that a pixel whose luminance is saturated is a pixel whose luminance value is equal to or larger than the first threshold value. Then, in a case where the calculated ratio is equal to or less than the second threshold value, the determination unit 120 determines that there is no region where the luminance is saturated in the selected biometric image. That is, in a case where the calculated ratio is greater than the second threshold value, the determination unit 120 determines that there is a region where the luminance is saturated in the selected biometric image.

In a case where there is no region where the luminance is saturated (step S4: NO), the image processing device 1 next selects between registration processing and verification processing (step S5). Selection of step S5 is performed by the registration verification unit 130. The registration verification unit 130 checks, for example, which of the processing of registering biometric information and the processing of verifying the biometric information is an instruction to be a trigger to start the processing currently being performed. In the case of performing registration processing of biometric information (step S5: registration), the registration verification unit 130 extracts biometric information from the biometric image and registers the biometric information in the registration biometric data 193 of the storage unit 190 (step S6). On the other hand, in the case of verifying the biometric information (step S5: verification), the registration verification unit 130 extracts biometric information from the biometric image to verify the biometric information against the biometric information registered in the registration biometric data 193 (step S7). In steps S6 and S7, the registration verification unit 130 extracts predetermined biometric information from the biometric image in accordance with a known extraction method. In a case where the biometric information to be extracted is a vein pattern, for example, the registration verification unit 130 divides a vein pattern in the biometric image into a plurality of line segments and extracts information such as the extended direction of each line segment, the position of the intersection point of the line segments, and the like as biometric information. In addition, in step S7, the registration verification unit 130 outputs the verification result. Furthermore, in step S7, in a case where the verification (authentication) is successful, the registration verification unit 130 executes predetermined processing (for example, processing of permitting access to predetermined information).

In this way, in a case where there is no region where the luminance is saturated in the biometric image, the image processing device 1 performs processing of registering biometric information extracted from the biometric image or processing of verifying the extracted biometric information. On the other hand, in a case where there is a region where the luminance is saturated in the biometric image (step S4: YES), the image processing device 1 next performs the saturation cause determination processing (S11). The determination unit 120 performs the saturation cause determination processing in step S11. The determination unit 120 determines whether the region where the luminance is saturated (saturated region) is caused by whether the body part being too close (proximity) or external light (other than proximity) based on the distribution of luminance in the biometric image. The determination unit 120 determines whether the saturated region is caused by proximity or external light based on the difference between the characteristic of the saturated region in a case where the body part is too close and the characteristic of the saturated region due to the influence of external light. The determination unit 120 notifies the image acquisition unit 110 of the cause of occurrence of the saturated region determined in step S11.

When saturation cause determination processing is completed in step S11, the image processing device 1 next determines whether or not the cause of occurrence of the saturated region is the body part being too close (proximity) (step S12). The determination in step S12 is performed by the image acquisition unit 110.

In a case where the cause of occurrence of the saturated region is proximity (step S12: YES), the image processing device 1 causes the display unit 310 of the touch panel device 3 or the like to display a message for moving the body part away from the biometric sensor device 2 (step S13). The processing of step S13 is performed by the image acquisition unit 110. For example, the image acquisition unit 110 creates image data including character information and graphic information for notifying the user to move the body part away from the biometric sensor device 2 and outputs the image data to the display unit 310 of the touch panel device 3. The message to be displayed on the display unit 310 of the touch panel device 3 in step S13 may be a message notifying that the position of the body part was too close and it was not possible to capture an appropriate biometric image.

On the other hand, in a case where the cause of occurrence of the saturated region is external light (other than proximity) (step S12: NO), the image processing device 1 changes control information for the imaging unit 210 and the light projecting unit 220 of the biometric sensor device 2 (step S14). The processing of step S14 is performed by the image acquisition unit 110. Based on the current control information and the change condition of the control information, the image acquisition unit 110 changes information indicating imaging conditions (for example, gain, exposure time, and the like) for the imaging unit 210 of the biometric sensor device 2 and information indicating the output (brightness) of the light projecting unit 220.

When the processing of step S13 or S14 is completed, the image processing device 1 performs the processing of step S2 and thereafter.

In this way, in a case where there is a region where the luminance is saturated in the biometric image, the image processing device 1 determines whether the cause of occurrence of the saturated region is the body part being too close (proximity) or external light based on the distribution of luminance in the biometric image. Then, in a case where the cause of occurrence of the saturated region is proximity, the image processing device 1 displays a message for reminding the user to move the body part away from the biometric sensor device 2 so that the biometric image is re-captured. That is, when the cause of the occurrence of the saturated region is proximity, the image processing device 1 causes the biometric sensor device 2 to re-capture a biometric image without changing the control information (for example, gain, exposure time, and the like) of the imaging unit 210 and the light projecting unit 220 of the biometric sensor device 2. On the other hand, in a case where the cause of the occurrence of the saturated region is external light, the image processing device 1 changes the control information of the imaging unit 210 and the light projecting unit 220 of the biometric sensor device 2 and causes the biometric sensor device 2 to re-capture a biometric image.

Figure 4:
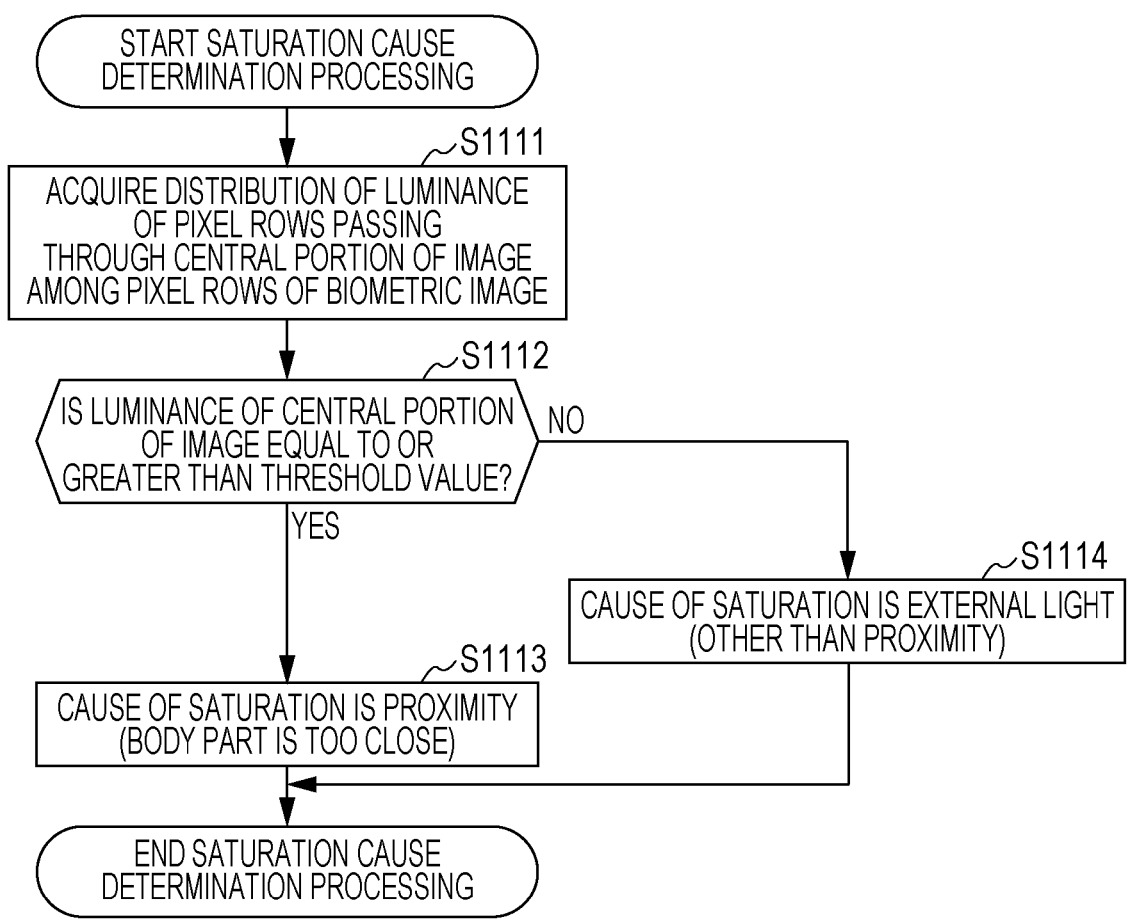
FIG. 4 is a flowchart for describing a first example of contents of saturation cause determination processing.

FIG. 4 is a flowchart for describing a first example of contents of saturation cause determination processing.

In the saturation cause determination processing, for example, at first, as illustrated in FIG. 4, the determination unit 120 acquires the distribution of the luminance of the pixel rows passing through the image central portion among the pixel rows of the biometric image (step S1111). In a case where the biometric image is rectangular, for example, at first, at the central portion in the extending direction of a first side in the biometric image, the determination unit 120 acquires a distribution of luminance of a first pixel row including a plurality of pixels aligned in an extending direction of a second side orthogonal to the first side. In addition, the determination unit 120 acquires the distribution of the luminance of a second pixel row including a plurality of pixels aligned in the extending direction of the first side orthogonal to the second side at the central portion in the extending direction of the second side in the biometric image.

Next, based on the distribution of luminance in the first pixel row and the distribution of luminance in the second pixel row, the determination unit 120 determines whether or not the luminance of the portion to be the central portion of the image is equal to or larger than a threshold value (step S1112). That is, in step S1112, in each of the luminance distribution of the first pixel row and the luminance distribution of the second pixel row, the determination unit 120 determines whether or not there is a section in which pixels whose luminance is saturated in the central portion in the direction of the pixel row.

In a case where the luminance of the portion to be the central portion of the image is equal to or larger than the threshold value (step S1112: YES), the determination unit 120 determines that the cause of saturation is proximity (the body part is too close) (step S1113). On the other hand, in a case where the luminance of the portion to be the central portion of the image is smaller than the threshold value (step S1112: NO), the determination unit 120 determines that the cause of saturation is external light (other than proximity) (step S1114). When the cause of saturation is determined in step S1113 or S1114, the determination unit 120 ends the saturation cause determination processing.

FIG. 5 is a diagram for describing features of a biometric image in a case where a distance from the biometric sensor device to the body part is too close.

Figure 5A:
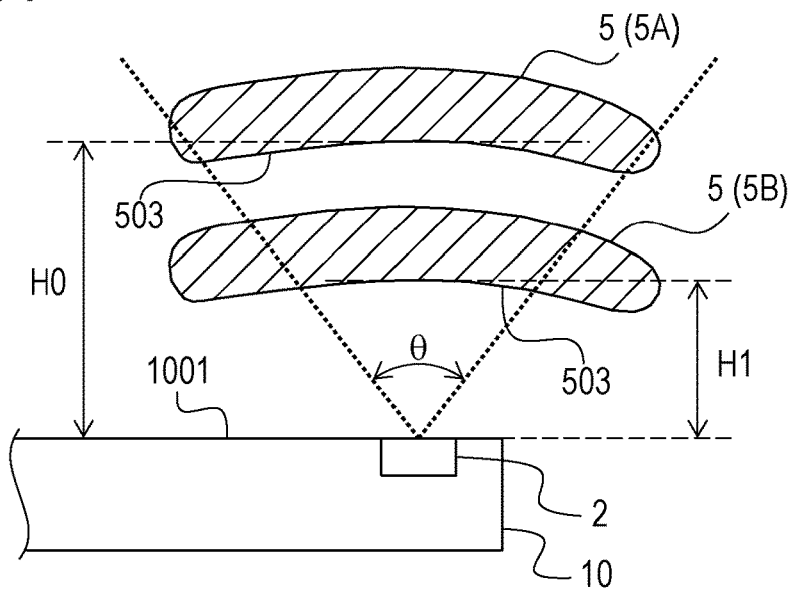
FIGS. 5A-5C are diagrams for describing features of a biometric image in a case where a distance from a biometric sensor device to a body part is too close.

FIG. 5A illustrates a relationship between a light irradiation range θ in the biometric sensor device 2 mounted on the portable electronic device 10 and the distance from the biometric sensor device 2 to the body part (hand 5). Here, the light exit surface of the light projecting unit 220 (not illustrated) of the biometric sensor device 2 matches a surface 1001 of the portable electronic device 10.

In the example of FIG. 5A, in a case where a distance h from the biometric sensor device 2 to a palm 503 is h=H0 as in the case of the hand 5 (5A) of the user, substantially the entire palm 503 is included in the light irradiation range θ of the biometric sensor device 2. Therefore, in a case where the distance h from the biometric sensor device 2 to the palm 503 of the hand 5A of the user is h=H0, the light emitted from the light projecting unit of the biometric sensor device 2 is irradiated to substantially the entire palm 503. Therefore, like a biometric image 6A in FIG. 5B, the distribution of luminance in the biometric image is substantially uniform. Therefore, in a case where the distance from the biometric sensor device 2 to the body part (palm 503) is within an appropriate range, the distribution of the luminance of a first pixel row PL1 in the biometric image 6A is a distribution 701A of a substantially fixed value smaller than a threshold value TH as in the graph illustrated on the right side of the biometric image 6A. The first pixel row PL 1 is a pixel row including a plurality of pixels aligned in a y direction orthogonal to an x direction at the central portion in the x direction in the biometric image 6A. The first pixel row PL1 passes through the image center portion of the biometric image 6A.

In addition, although not illustrated, the distribution of the luminance of a second pixel row PL2 in the biometric image 6A has a distribution of a substantially fixed value that is smaller than the threshold value TH, similar to the distribution 701A. The second pixel row PL2 is a pixel row including a plurality of pixels aligned in the x direction orthogonal to the y direction at the central portion in the y direction in the biometric image 6A. The second pixel row PL2 passes through the image center portion of the biometric image 6A.

In addition, in FIG. 5A, the relationship between the palm 503 and the light irradiation range θ is also illustrated in a case where the distance h from the biometric sensor device 2 to the palm 503 is h=H1 (<H0) as in the hand 5 of the user (5B). Thus, when the position of the body part (palm 503) with respect to the biometric sensor device 2 is too close, only the central portion of the palm 503 is included in the light irradiation range θ of the biometric sensor device 2. Therefore, in a case where the distance h from the biometric sensor device 2 to the palm 503 of the hand 5B of the user is shorter than an appropriate distance, light emitted from the light projecting unit of the biometric sensor device 2 is irradiated only to the central portion of the palm 503. Therefore, as illustrated in a biometric image 6B of FIG. 5C, the distribution of luminance in the biometric image is the height at which the luminance of a first region 601 including the central portion of the image is saturated and the luminance of a second region 602 outside the first region 601 is lower than the luminance of the first region 601. Therefore, in a case where the position of the body part (palm 503) with respect to the biometric sensor device 2 is too close, the distribution of the luminance of the first pixel row PL1 in the biometric image 6B is as illustrated by a distribution 701B of the graph illustrated on the right side of the biometric image 6B. That is, a section L1 corresponding to the central portion of the image (first region 601A) in the biometric image 6B in the first pixel row PL1 has a substantially fixed value with luminance larger than the threshold value TH, and the other section has a value smaller than the threshold value TH.

In addition, although not illustrated, the distribution of the luminance of the second pixel row PL2 in the biometric image 6A has a distribution similar to that of the distribution 701B.

In this way, in a case where the distance from the biometric sensor device 2 to the body part is shorter than the appropriate distance, the distribution of the luminance in the biometric image is such that the luminance of the central portion of the image (first region 601) is saturated at or above the threshold value TH and the luminance of the image peripheral portion (second region 602) is smaller than the threshold value TH. That is, the biometric image in the case where the cause of the saturation of the luminance is proximity has a characteristic that the luminance at the central portion of the image is higher than the luminance at the peripheral portion of the image.

On the other hand, the biometric image in the case where the cause of the saturation of the luminance is the influence of the external light has a characteristic that a high luminance region (saturated region) is seen in the outer peripheral portion of the image.

FIG. 6 is a diagram for describing the influence of external light on the biometric image.

Figure 6A:
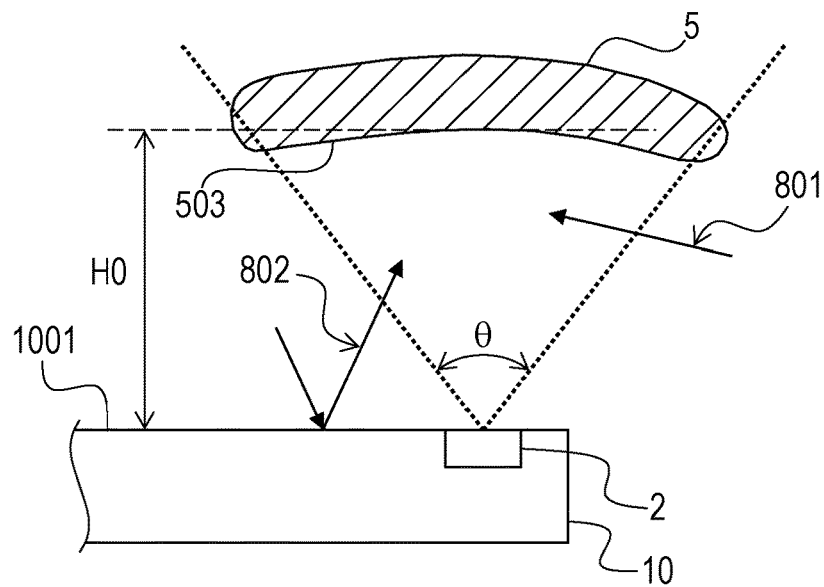
FIGS. 6A-6C are diagrams for describing the influence of external light on the biometric image.
Figure 6B:
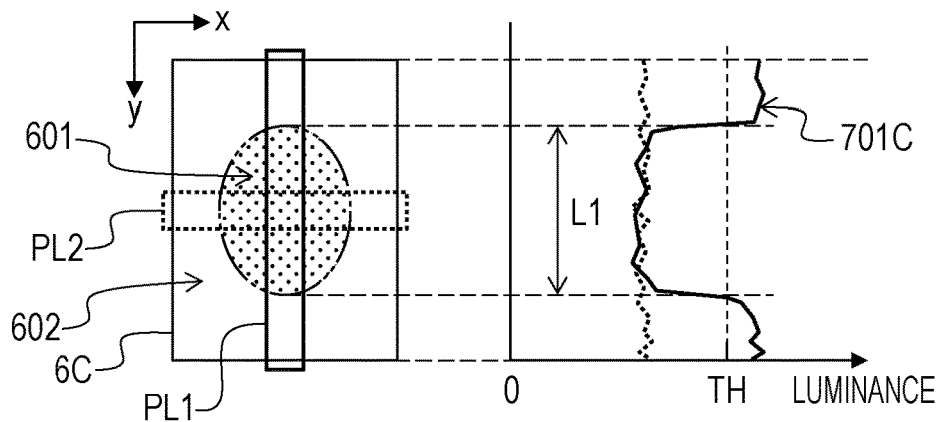
Figure 6C:
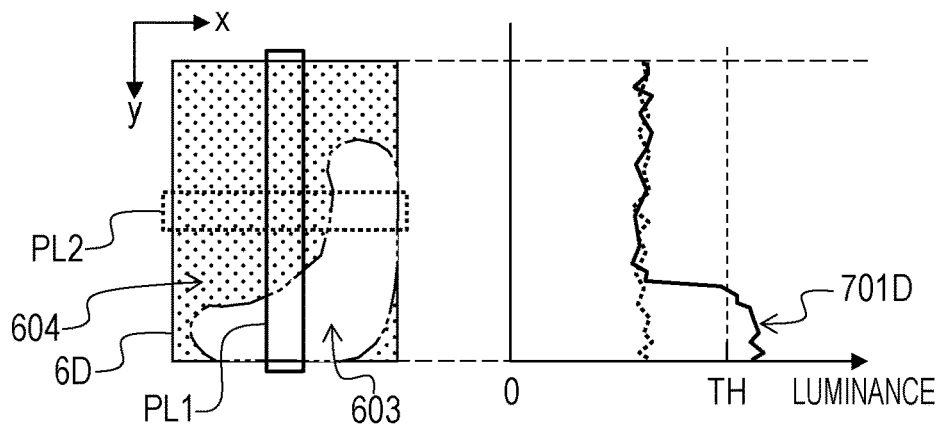

FIG. 6A illustrates a relationship between a light irradiation range θ in the biometric sensor device 2 mounted on the portable electronic device 10 and the distance from the biometric sensor device 2 to the body part (hand 5). Here, the light exit surface of the light projecting unit 220 (not illustrated) of the biometric sensor device 2 matches a surface 1001 of the portable electronic device 10.

Figure 5B:
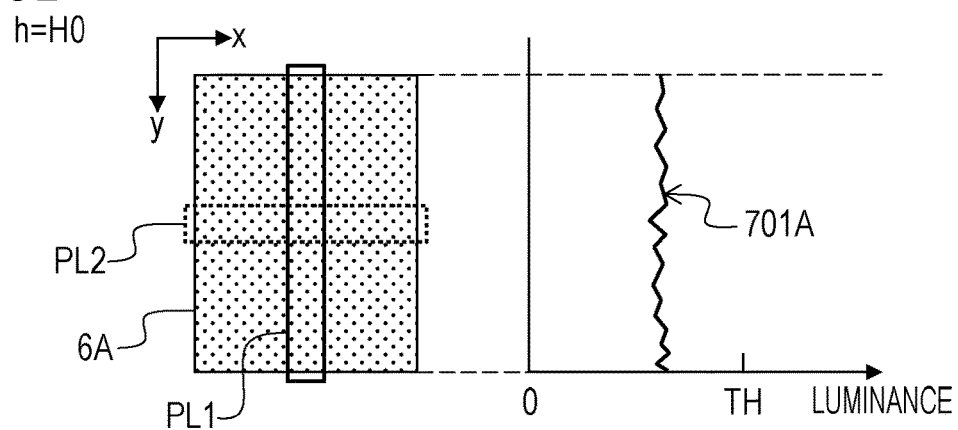
Figure 5C:
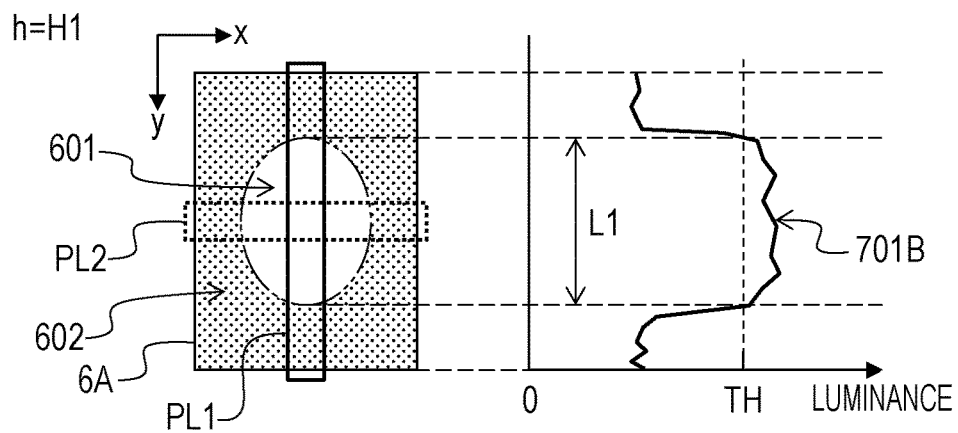

In the example of FIG. 6A, the distance h from the biometric sensor device 2 to the palm 503 of the hand 5 of the user is an appropriate distance (h=H0), and substantially the entire palm 503 is included in the light irradiation range θ of the biometric sensor device 2. Accordingly, for example, like a biometric image when the biometric image is captured in a room, the distribution of the luminance in the biometric image in which the influence of external light is small is substantially uniform distribution 701A as illustrated in FIG. 5B.

However, in the case of capturing a biometric image in an environment with strong external light (for example, outdoors during a day in sunny days), strong external light 801 and 802 may be incident on the palm 503 from between the biometric sensor device 2 and the body part (palm 503). In a case where a biometric image is captured in a state where strong external light is incident on a body part (palm 503) as described above, for example, the luminance of the outer peripheral portion of the image (the second region 602) becomes higher than the luminance of the central portion of the image (the first region 601) as in a biometric image 6C of FIG. 6B. Therefore, the distribution of the luminance of the first pixel row PL1 in the biometric image 6B, which is influenced by the strong external light, is as illustrated by a distribution 701C of the graph illustrated on the right side of the biometric image 6B. That is, a section L1 corresponding to the central portion of the image (first region 601A) in the biometric image 6C in the first pixel row PL1 has a substantially fixed value with luminance smaller than the threshold value TH, and the other section has a value larger than the threshold value TH.

In addition, although not illustrated, the distribution of the luminance of the second pixel row PL2 in the biometric image 6C has a distribution similar to that of the distribution 701C.

When actually capturing a biometric image under an environment with strong external light, for example, a deviation occurs in a portion of the body part (palm 503) that is influenced by external light, depending on the surface shape of the body part and the positional relationship between the body part and other surrounding objects such as the portable electronic device 10. Therefore, in a biometric image influenced by external light, the distribution of luminance may become an unbalanced distribution as in a biometric image 6D of FIG. 6C, for example. In the biometric image 6D, an inverted L-shaped region 603 on the right-side portion and the lower portion is a region where luminance is saturated, and the other region 604 is a region where luminance is lower than that of the region 603. Therefore, the distribution of the luminance of the first pixel row PL1 in the biometric image 6D is as illustrated by a distribution 701D of the graph illustrated on the right side of the biometric image 6D. That is, the section below the image in the biometric image 6D in the first pixel row PL1 has a value with luminance larger than the threshold value TH, and in the other section has a substantially fixed value with luminance smaller than the threshold value TH.

As described above, in a biometric image that is influenced by external light, a deviation may occur in the region where the luminance is saturated in the image. However, in the case of looking at the distribution of the saturated region in the entire image, there is a common characteristic that a region where the luminance is saturated occurs in the outer peripheral portion of the image. That is, in a biometric image that is influenced by external light, a saturated region with higher luminance than the central portion of the image occurs in the outer peripheral portion of the image contrary to the biometric image in which the luminance is saturated due to proximity.

Therefore, it is possible to determine whether the cause of the saturation of the luminance in the biometric image is proximity or external light based on the distribution of luminance in the pixel rows (for example, the first pixel row PL1 and the second pixel row PL2) passing through the central portion of the image.

In a case where the cause of saturation of luminance is proximity (the body part is too close), for example, even if saturation is removed by re-capturing by changing imaging conditions and the like of the imaging unit 210 in the biometric sensor device 2, the proximity state is not resolved. That is, in a case where the cause of saturation of luminance is proximity, even if saturation of luminance is removed by changing the imaging conditions or the like of the imaging unit 210, if the position of the body part remains too close, the biometric image becomes unclear, and it is difficult to extract appropriate biometric information. Therefore, for example, in a case where it is determined that the cause of saturation of luminance is proximity from a re-captured biometric image, the user is guided to capture a biometric image by moving the body part away from the biometric sensor device 2 and re-capturing is performed. Therefore, in a case where the cause of saturation of luminance is proximity, unless measures are taken to resolve that the body part is too close, additional re-capturing is repeated, which sometimes reduces convenience for the user. Furthermore, in the case of changing the imaging conditions of the imaging unit 210 to avoid the occurrence of the saturated region, the imaging conditions are changed in a direction in which the amount of light incident on the imaging unit 210 decreases. Therefore, by changing the imaging conditions a plurality of times, there is a possibility that the amount of information of the region originally outside the saturated region is lowered and the biometric image is low in extraction accuracy of biometric information.

On the other hand, in the image processing device 1 of the present embodiment, it is determined whether the cause of saturation is proximity or external light based on the luminance distribution (characteristics of the saturated region) in the biometric image. Then, in a case where the cause of saturation is proximity, the user is guided to re-capture a biometric image by moving the body part away from the biometric sensor device 2 without changing the imaging conditions of the imaging unit 201. Therefore, according to the present embodiment, in a case where the cause of saturation is proximity, it is possible to easily re-capture a biometric image that does not include a saturated region, thereby avoiding deterioration in convenience due to repetition of re-capturing. In addition, in a case where the cause of saturation is proximity, since it is possible to acquire a biometric image without greatly changing the imaging conditions of the biometric sensor device 2 from the initial conditions, it is possible to suppress deterioration in authentication accuracy due to a decrease in extraction accuracy of biometric information.

The image processing device 1 according to the present embodiment is not limited to the above configuration and may be modified within a range not deviating from the gist of the present embodiment. For example, the image processing device 1 of the present embodiment is not limited to the touch panel device 3 and may be a device used in combination with a display device corresponding to the display unit 310 and an input device corresponding to the detection unit 320. In addition, the image processing device 1 of the present embodiment may be a device used in combination with a biometric sensor device that extracts biometric information (for example, face, iris, or the like) different from the vein of the palm.

The flowchart of FIG. 3 is merely an example of the processing performed by the image processing device 1 of the present embodiment. The processing performed by the image processing device 1 of the present embodiment is not limited to the processing according to the flowchart of FIG. 3 and may be changed within a range not deviating from the gist of the present embodiment. In addition, in the present embodiment, an example is described in which the present disclosure is applied to the portable electronic device 10 as illustrated in FIG. 2 and a plurality of biometric images are captured and acquired in one time of processing. However, one biometric image may be captured in one time of processing.

In addition, the flowchart of FIG. 4 is merely an example of the saturation cause determination processing performed by the image processing device 1 of the present embodiment. The saturation cause determination processing is not limited to the processing according to the flowchart of FIG. 4 and may be appropriately changed without departing from the gist of the present embodiment.

Figure 7:
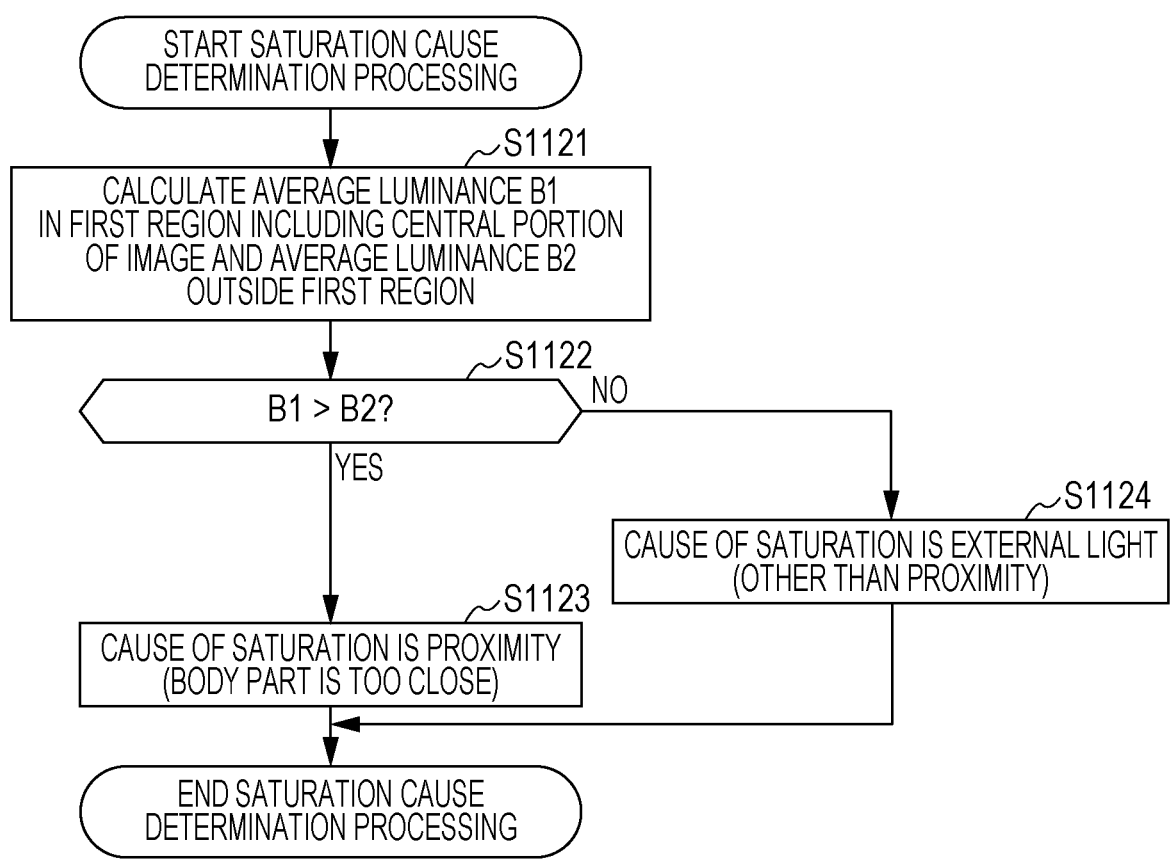
FIG. 7 is a flowchart for describing a second example of contents of saturation cause determination processing.

FIG. 7 is a flowchart describing a second example of the contents of the saturation cause determination processing.

In the second example of the saturation cause determination processing, as illustrated in FIG. 7, at first, the determination unit 120 calculates an average luminance B1 in a first region including the central portion of the image in the biometric image and an average luminance B2 outside the first region (step S1121). Here, the first region is, for example, the first region 601 including the central portion of the image in the biometric image 6B of FIG. 5C, and the first region is the second region 602 outside the first region. The shape of the first region 601 is not limited to the elliptical shape (oval shape) illustrated in FIG. 5C or the like and may be set appropriately. Similarly, the dimensions of the first region 601 may be appropriately set. In the case where the first region is an elliptical shape (oval shape) illustrated in FIG. 5C or the like, for example, the dimension in a short side direction and the dimension in a long side direction are set to ½ of the dimension in the x direction and the dimension in the y direction in the biometric image, respectively.

Next, the determination unit 120 determines whether or not the magnitude relationship of the calculated average luminance B1 and B2 is B1>B2 (step S1122). The fact that the average luminance B1 in the central portion of the image is larger than the average luminance B2 in the outer peripheral portion of the image indicates that the distance between the biometric sensor device 2 and the body part is too close to an appropriate distance as described above. Therefore, in the case of B1>B2 (step S1122: YES), the determination unit 120 determines that the cause of saturation is proximity (step S1123). On the other hand, in the case of B1≤B2 (step S1122: NO), the determination unit 120 determines that the cause of saturation is external light (step S1124). When determining the cause of saturation in step S1123 or S1124, the determination unit 120 ends the saturation cause determination processing.

As described above, in the saturation cause determination processing of the present embodiment, it is also possible to divide the biometric image into a first region including the central portion of the image and a second region outside the first region and determine the cause of saturation based on the magnitude relationship of the average luminance in each region.

In addition, in the case of determining the cause of saturation based on the distribution of luminance in pixel rows as in the first example of saturation cause determination processing (see FIGS. 4 to 6), for example, a deviation may occur between the position of the pixel row for which the distribution of luminance is examined in the biometric image and the position of the region where the luminance is saturated. In a case where there is a deviation between the position of the pixel row for which the distribution of luminance is examined and the position of the region where the luminance is saturated, there is a possibility that an appropriate luminance distribution may not be obtained and the cause of saturation may be determined as a wrong cause. On the other hand, as in the second example of the saturation cause determination processing, it is possible to reduce the possibility of determining the cause of saturation as a wrong cause by determining the cause of saturation by using information on the luminance of the entire biometric image.

In addition, the information used for determination the cause in the saturation cause determination processing is not limited to the magnitude relationship between the luminance value of the pixel row and the average luminance of the first region including the central portion of the image and the average luminance outside the first region and may be the shape of the saturated region or the position of the center, for example. For example, in a case where the cause of saturation is proximity, the saturated region has an isotropic shape centered on the image center as illustrated in the biometric image 6B of FIG. 5C. On the other hand, in a case where the cause of saturation is external light, the saturated region extends to the outer peripheral portion of the image as in the biometric image 6C in FIG. 6B or the biometric image 6D in FIG. 6C. Therefore, it is also possible to determine whether the cause of the saturation is proximity or the influence of external light based on the shape of the saturated region, the position of the center, and the like.

In addition, the portable electronic device 10 of FIG. 2 is only one example of application of the image processing device 1 of the present embodiment. The image processing device 1 according to the present embodiment may be, for example, a device provided separately from an electronic device including the biometric sensor device 2 and the touch panel device 3.

Figure 8:
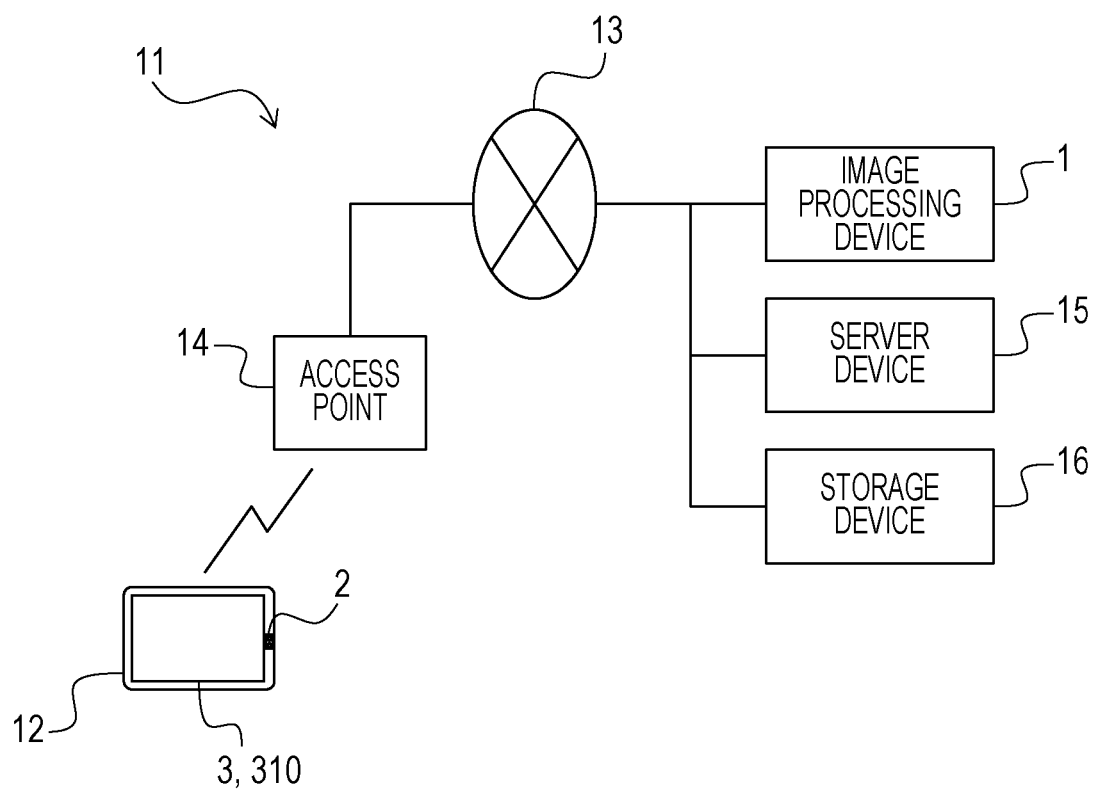
FIG. 8 is a diagram for describing another application example of the image processing device.

FIG. 8 is a diagram for describing another application example of the image processing device.

FIG. 8 illustrates an example of an authentication system 11 including the image processing device 1 and an electronic device 12. The image processing device 1 is connected to the network 13 such as the Internet together with a server device 15 and a storage device 16. In addition, the electronic device 12 includes the biometric sensor device 2, the touch panel device 3, and a wireless communication device (not illustrated). The electronic device 12 is not limited to a portable electronic device having versatility such as a tablet-type computer or a smartphone but may be an electronic device dedicated for authentication. The electronic device 12 is connected to the network 13 via an access point 14 by establishing a connection with the access point 14 according to a predetermined wireless communication standard. The electronic device 12 and the access point 14 may be connected not only by wireless communication but also by a communication cable.

For example, when the user of the electronic device 12 is authenticated in the image processing device 1, the electronic device 12 may access the server device 15 and the storage device 16.

In a case where the image processing device 1 of the present embodiment is applied to the authentication system 11 as illustrated in FIG. 8, for example, it is possible to perform authentication processing for a plurality of users in one image processing device 1.

Figure 9:
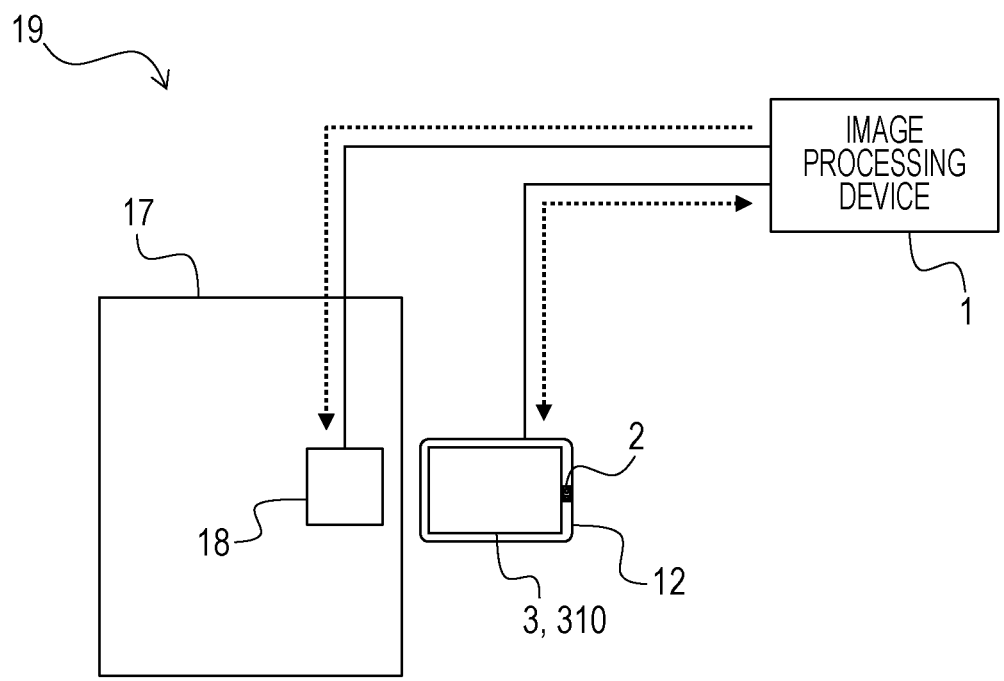
FIG. 9 is a diagram for describing still another application example of the image processing device.

FIG. 9 is a diagram for describing still another application example of the image processing device.

The image processing device 1 according to the present embodiment is applicable not only to a specific authentication system but also to various authentication systems as long as the system is an authentication system using biometric information. For example, FIG. 9 illustrates an example in which the image processing device 1 of the present embodiment is applied to an authentication system 19 that controls unlocking of an electronic lock 18 provided in a door 17 of a building. In this type of authentication system 19, for example, the electronic device 12 including the biometric sensor device 2 and the touch panel device 3 is installed in the vicinity of the door 17, and the image processing device 1 is installed in a safe place separated from the door 17. Then, the biometric image captured by the biometric sensor device 2 of the electronic device 12 is transmitted to the image processing device 1, and the image processing device 1 performs authentication processing by using the biometric image. In a case where the authentication is successful, the image processing device 1 unlocks the electronic lock 18 so that the door 17 may be opened. Thereafter, in a case where the opened door 17 is closed, or in a case where a predetermined period has elapsed since the electronic lock 18 is unlocked, the door 17 is locked by the electronic lock 18.

Even in such the authentication system 19, for example, in a case where the installation place of the electronic device 12 is outdoors or near the window and the fluctuation range of the intensity of external light is large, it is possible to avoid deterioration of the convenience when re-capturing by applying the image processing device 1 of the present embodiment.

The image processing device 1 is not limited to a device that performs biometric authentication using biometric information extracted from a biometric image but may be a device that acquires an image from which biometric information may be extracted. That is, the image processing device 1 may be a device in which the registration verification unit 130 is omitted.

The image processing device 1 may be realized by a computer and a program executed by the computer. Hereinafter, the image processing device 1 realized by a computer and a program will be described with reference to FIG. 10.

Figure 10:
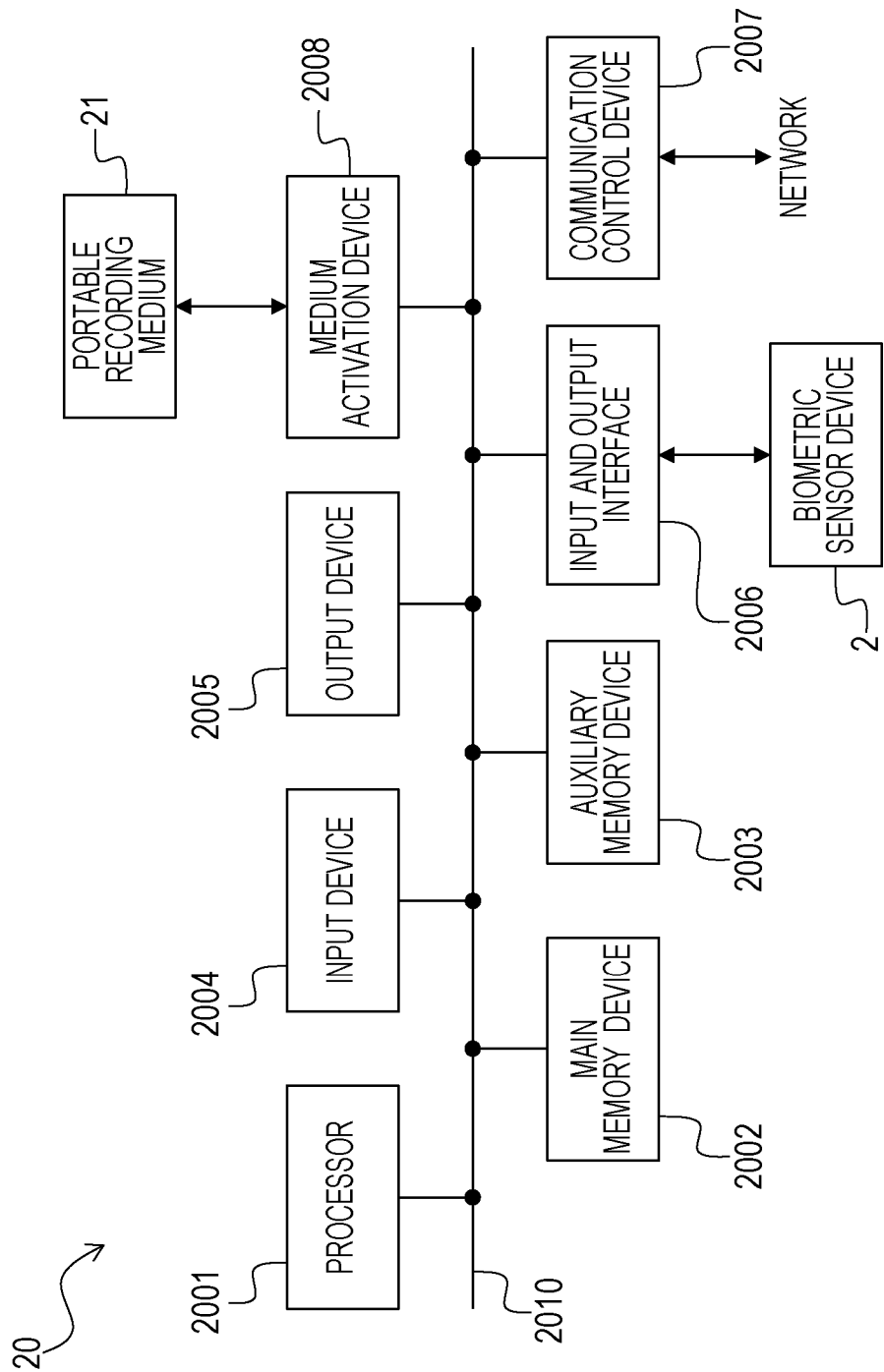
FIG. 10 is a diagram illustrating a hardware configuration of a computer.

FIG. 10 is a diagram illustrating a hardware configuration of a computer.

As illustrated in FIG. 10, the computer 20 includes a processor 2001, a main storage device 2002, an auxiliary storage device 2003, an input device 2004, an output device 2005, an input and output interface 2006, a communication control device 2007, and a medium activation device 2008. These components 2001 to 2008 in the computer 20 are mutually connected by a bus 2010, and data may be exchanged between the components.

The processor 2001 is a central processing unit (CPU), a micro processing unit (MPU), or the like. The processor 2001 controls the overall operation of the computer 20 by executing various programs including an operating system. In addition, for example, the processor 2001 acquires a biometric image without a region where the luminance is saturated to register to perform registration of verification of biometric information by executing an image processing program including each processing in the flowchart of FIG. 3. The saturation cause determination processing (step S11) in the image processing program is, for example, the processing according to the flowchart in FIG. 4 or FIG. 7.

The main storage device 2002 includes read-only memory (ROM) and random-access memory (RAM) (not illustrated). In the ROM of the main storage device 2002, for example, a predetermined basic control program and the like to be read by the processor 2001 at the time of activation of the computer 20 are recorded in advance. In addition, the RAM of the main storage device 2002 is used as a working storage area as occasion arises by the processor 2001 when executing various programs. The RAM of the main storage device 2002 may be used for storing, for example, the control information 191, the image data 192, the registration biometric data 193, and the like.

The auxiliary storage device 2003 is a storage device having a larger capacity than the RAM of the main storage device 2002 such as a hard disk drive (HDD) and nonvolatile memory (including a solid-state drive (SSD)) such as flash memory. The auxiliary storage device 2003 may be used for storing various programs and various data executed by the processor 2001. The auxiliary storage device 2003 may be used for storing, for example, an image processing program including each processing in the flowchart of FIG. 3. In addition, the auxiliary storage device 2003 may be used for storing, for example, the control information 191, the image data 192, the registration biometric data 193, and the like.

The input device 2004 is, for example, a digitizer (for example, the detection unit 320 of the touch panel device 3), a keyboard device, or the like. When an operator (user) of the computer 20 performs a predetermined operation on the input device 2004, the input device 2004 transmits the input information associated with the operation contents to the processor 2001. In addition, the input device 2004 may include the biometric sensor device 2 including the imaging unit 210 and the light projecting unit 220.

The output device 2005 is, for example, a display device such as a liquid crystal display device or an audio play device such as a speaker. The output device 2005 may be used, for example, as the display unit 310 of the touch panel device 3.

The input and output interface 2006 connects the computer 20 to another electronic device. The input and output interface 2006 includes, for example, a connector of the Universal Serial Bus (USB) standard. The input and output interface 2006 may be used, for example, for connecting the computer 20 and the biometric sensor device 2.

The communication control device 2007 is a device that connects the computer 20 to a network such as the Internet and controls various communications between the computer 20 and another electronic device via a network. The communication control device 2007 may be used for communication between the computer 20 operated as the image processing device 1 and the electronic device 12 via the network 13, for example (see FIG. 8).

The medium activation device 2008 reads out programs and data recorded on the portable recording medium 21 and writes the data and the like recorded in the auxiliary storage device 2003 to the portable recording medium 21. For the medium activation device 2008, for example, a memory card reader and writer compatible with one or more standards may be used. In a case where a memory card reader and writer is used as the medium activation device 2008, as the portable recording medium 21, a memory card reader and writer compatible with the memory card reader and writer, for example, a memory card (flash memory) of the Secure Digital (SD) standard or the like may be used. In addition, as the portable recording medium 21, for example, a flash memory having a USB standard connector may be used. Furthermore, in a case where the computer 20 is equipped with an optical disk drive usable as the medium activation device 2008, various optical discs recognizable by the optical disc drive may be used as the portable recording medium 21. Examples of optical discs usable as the portable recording medium 21 include a compact disc (CD), a digital versatile disc (DVD), a Blu-ray disc (Blu-ray is a registered trademark), and the like. The portable recording medium 21 may be used for storing, for example an image processing program including each processing in the flowchart of FIG. 3. In addition, the portable recording medium 21 may be used for storing, for example, the control information 191, the image data 192, the registration biometric data 193, and the like.

When an instruction to start acquiring a biometric image is input to the computer 20, the processor 2001 reads out and executes the image processing program stored in the non-transitory recording medium such as the auxiliary storage device 2003. While the image processing program is being executed, the processor 2001 functions (operates) as the image acquisition unit 110, the determination unit 120, and the registration verification unit 130 in the image processing device 1. In addition, while the image processing program is being executed, the storage device such as the RAM of the main storage device 2002 or the auxiliary storage device 2003 functions as the storage unit 190 of the image processing device 1.

The computer 20 operated as the image processing device 1 does not have to include all the components 2001 to 2008 illustrated in FIG. 10, and it is also possible to omit some components according to the usage and conditions. For example, in the computer 20, the medium activation device 2008 may be omitted.

In addition, the saturation cause determination processing (step S11) in the image processing program to be executed by the computer 20 is not limited to the processing according to the flowchart of FIG. 4 but may be the processing according to the flowchart of FIG. 7.

Furthermore, for example, in the image processing program, the processing of steps S5 to S7 in the flowchart of FIG. 3 may be omitted. In a case where the computer 20 executes the image processing program in which the processing in steps S5 to S7 is omitted, the processor 2001 functions (operates) as the image acquisition unit 110 and the determination unit 120 in the image processing device 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing apparatus comprising:
a memory, and
a processor coupled to the memory and configured to execute a process comprising:
acquiring an image of a body part captured by an imaging circuit; and
determining, in a case where there is a region where luminance is saturated in the acquired image, a cause of the saturation of the luminance based on a distribution of the luminance in the acquired image,
wherein in the determining, when a region where the luminance is saturated includes a central portion in the image, the cause of the saturation of the luminance is the distance between the imaging circuit and the body part being shorter than a predetermined distance.

2. The image processing apparatus according to claim 1, wherein in the determining, the cause of the saturation of the luminance is an influence of external light when the region where the luminance is saturated does not include a central portion in the acquired image, determining the cause of the saturation of the luminance is an influence of external light.

3. The image processing apparatus according to claim 1, wherein the process further comprising:
notifying the imaging circuit of the cause of the saturation of the luminance, and
causing the imaging circuit, in a case where the cause of the saturation of the luminance is the distance between the imaging circuit and the body part being shorter than a predetermined distance, to increase the distance from the imaging circuit to the body part and then to acquire an image of the body part again, and
in a case where the cause of the saturation of the luminance is an influence of external light, to change imaging conditions of the imaging circuit to acquire an image of the body part again.

4. The image processing apparatus according to claim 1, wherein in the determining, when a luminance of a predetermined section including the central portion of the image is saturated in a distribution of the luminance of pixel rows passing through the central portion of the image, the cause of the saturation of the luminance is the distance between the imaging circuit and the body part being shorter than the predetermined distance.

5. The image processing apparatus according to claim 4, wherein in the determining, the cause of the saturation of the luminance is determined based on the distribution of luminance in each of a plurality of pixel rows having different directions.

6. The image processing apparatus according to claim 1, wherein in the determining, an average luminance in a first region including the central portion of the image and an average luminance outside the first region are calculated, and
when the average luminance in the first region is higher than the average luminance outside the first region, the cause of the saturation of the luminance is the distance between the imaging circuit and the body part being shorter than the predetermined distance.

7. The image processing apparatus according to claim 1, wherein in the determining, a region in which the luminance is saturated in the image is extracted, and the cause of the saturation of the luminance is determined based on a shape of the region and a position thereof in the image.

8. The image processing apparatus according to claim 1, wherein the acquiring, a plurality of images of the body part having different relative positions with respect to the imaging circuit are acquired.

9. The image processing apparatus according to claim 1, the process further comprising:
extracting biometric information from the image when there is no region in which the luminance is saturated in the acquired image, and
registering the biometric information, or verifying the biometric information against biometric information registered in advance.

10. A computer-implemented method for image processing, the method comprising:
acquiring an image of a body part captured by an imaging circuit; and
determining, in a case where there is a region where luminance is saturated in the acquired image, a cause of the saturation of the luminance based on a distribution of the luminance in the acquired image,
wherein in the determining, when a region where the luminance is saturated includes a central portion in the image, the cause of the saturation of the luminance is the distance between the imaging circuit and the body part being shorter than a predetermined distance.

11. The method according to claim 10, wherein in the determining, the cause of the saturation of the luminance is an influence of external light when the region where the luminance is saturated does not include a central portion in the acquired image, determining the cause of the saturation of the luminance is an influence of external light.

12. The method according to claim 10, wherein the process further comprising:
notifying the imaging circuit of the cause of the saturation of the luminance, and
causing the imaging circuit, in a case where the cause of the saturation of the luminance is the distance between the imaging circuit and the body part being shorter than a predetermined distance, to increase the distance from the imaging circuit to the body part and then to acquire an image of the body part again, and
in a case where the cause of the saturation of the luminance is an influence of external light, to change imaging conditions of the imaging circuit to acquire an image of the body part again.

13. A non-transitory computer-readable storage medium storing an image processing program configured to cause a computer to execute a process comprising:
acquiring an image of a body part captured by an imaging circuit; and
determining, in a case where there is a region where luminance is saturated in the acquired image, a cause of the saturation of the luminance based on a distribution of the luminance in the acquired image,
wherein in the determining, when a region where the luminance is saturated includes a central portion in the image, the cause of the saturation of the luminance is the distance between the imaging circuit and the body part being shorter than a predetermined distance.

14. The storage medium according to claim 13,
wherein in the determining, the cause of the saturation of the luminance is an influence of external light when the region where the luminance is saturated does not include a central portion in the acquired image, determining the cause of the saturation of the luminance is an influence of external light.

15. The storage medium according to claim 13,
wherein the process further comprising:
notifying the imaging circuit of the cause of the saturation of the luminance, and
causing the imaging circuit, in a case where the cause of the saturation of the luminance is the distance between the imaging circuit and the body part being shorter than a predetermined distance, to increase the distance from the imaging circuit to the body part and then to acquire an image of the body part again, and
in a case where the cause of the saturation of the luminance is an influence of external light, to change imaging conditions of the imaging circuit to acquire an image of the body part again.

\* \* \* \* \*